L. A. HELMS.
AGRICULTURAL MACHINE.
APPLICATION FILED OCT. 15, 1919.
1,331,641.
Patented Feb. 24, 1920.
2 SHEETS—SHEET 1.
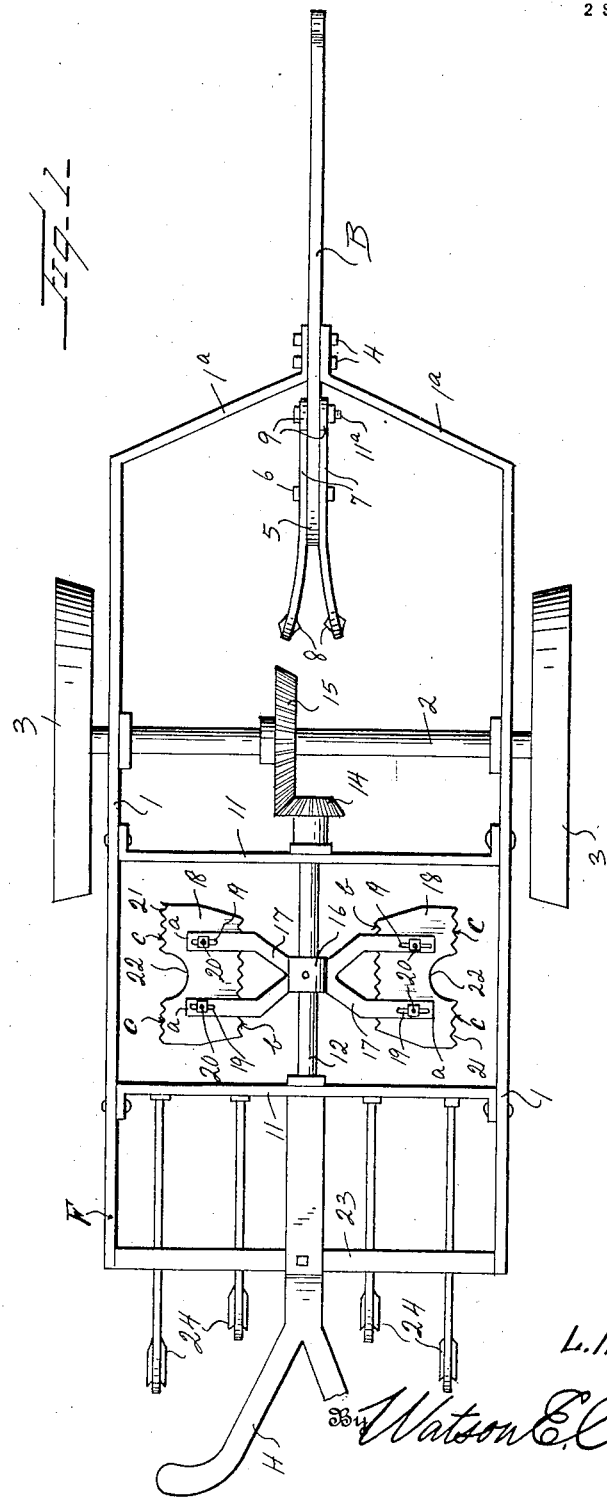
Inventor
L. A. Helms
By Watson E. Coleman
Attorney

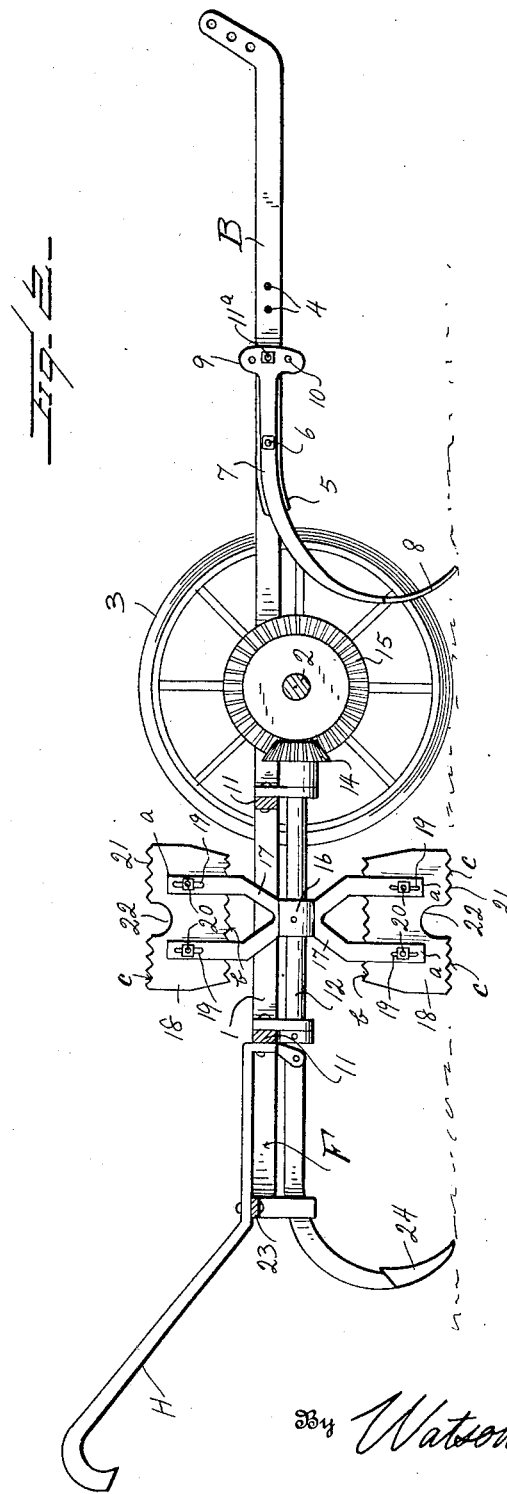

UNITED STATES PATENT OFFICE.

LOUIS A. HELMS, OF DECATUR, GEORGIA.

AGRICULTURAL MACHINE.

1,331,641.      Specification of Letters Patent.      Patented Feb. 24, 1920.

Application filed October 15, 1919. Serial No. 330,806.

*To all whom it may concern:*

Be it known that I, LOUIS A. HELMS, a citizen of the United States, residing at Decatur, in the county of Dekalb and State of Georgia, have invented certain new and useful Improvements in Agricultural Machines, of which the following is a specification, reference being had to the accompanying drawings.

This invention relates to certain improvements in agricultural machines, and it is an object of the invention to provide a novel and improved device of this general character which is particularly adapted for use as a crust buster or as a cotton chopper.

Another object of the invention is to provide a novel and improved device of this general character wherein an earth working member is supported for revolving movement about an axis disposed in the same general direction as the direction of travel of the machine, and wherein said member is in driven engagement with a supporting wheel or other rotatable part of the machine.

An additional object of the invention is to provide a novel and improved device of this general character wherein the earth working member comprises a flat blade adjustably engaged with the supporting arm, and which supporting arm is carried by a rotatable shaft.

A still further object of the invention is to provide a machine of this general character including suitably supported shovels or plows which operate to cultivate or break the crust at opposite sides of a plant row.

The invention consists in the details of construction and in the combination and arrangement of the several parts of my improved agricultural machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein:

Figure 1 is a view in top plan with a portion broken away, of an agricultural machine constructed in accordance with an embodiment of my invention, and, Fig. 2 is a view partly in longitudinal vertical section and partly in elevation of the machine as illustrated in Fig. 1.

As disclosed in the accompanying drawings, F denotes a frame including the side members 1 having their forward end portions loosely engaged with a transverse axle 2. The extremities of the axles 2 are provided with the supporting wheels 3, said supporting wheels operating to cause the axle 2 to rotate as the machine travels over the ground. The forward end portions 1ª of the side members 1 in advance of the axle 2 are arranged in convergence with the extremities thereof secured through the instrumentality of the bolts 4 or the like with the side faces of a beam B. The beam B extends outwardly of the frame F and terminates in the upstanding standard or post to which the draft rigging is adapted to be hitched. The beam B also extends inwardly of the frame F and the inner extremity thereof terminates in the downwardly directed extension 5. Supported at opposite sides of the extension 5 by the bolt 6 or the like are the shanks 7 of the resilient ground working teeth 8 or the like. The shanks 7 extend forwardly and longitudinally of the beam B and have their forward end portions terminating in the enlarged portions 9, each provided with a series of vertically spaced openings 10, preferably arcuately arranged and concentric to the bolt 6.

A bolt 11ª is adapted to be disposed through the beam B and certain of said openings 10, so that the teeth 8 or the like may be adjusted as the occasions of practice may require. The teeth 8 are adapted, in practice, to engage the ground at opposite sides of a plant row, and particularly to break the crust.

Rearwardly of the axle 2 the side members 1 of the frame F are connected by the longitudinally spaced cross members 11 and rotatably supported by said members 11 at substantially the transverse center of the frame F is a longitudinally disposed shaft 12 provided at its forward end with a gear 14 meshing with a gear 15 carried by the axle 2, so that the shaft 12 is caused to rotate in unison with the axle 2. Fixed to the shaft 12 substantially midway between the members 11 is a hub or sleeve 16, and said hub or sleeve 16 is provided with the oppositely directed and diametrically opposed forks 17, each of said forks including a pair of arms a. The extremities of the arms a overlie a marginal portion of the flat ground working member or blade 18, and said overlapping portions of the arms a are provided with the longitudinally directed slots 19, through which are directed the clamping bolts 20 carried by the member or blade 18, whereby the blade 18 may be adjusted toward or from the axle 12 as the requirements of practice may necessitate.

Each of the flat members or blades 18 has its longitudinal edges of different lengths with the shorter edge b substantially centrally arranged with respect to the longer edge c. The edges b and c are provided with the teeth 21 so that the cutting action thereof is materially facilitated and the central portion of the edge c is cut out or recessed, as at 22, so that when the edge c is worked the cut out portion or recess 22 of each of the members or blades 18, when the device is used as a cotton chopper, will leave the plant standing at regular intervals.

Should it be preferred not to use the edges c of the members or blades 18, the same can be readily reversed to permit the edges b to work, and these edges, upon the rotation of the shaft 12, will permit the cotton to stand at regular intervals.

The rear end portions of the side members 1 of the frame F are connected by the transverse member 23, and said member 23 and the adjacent cross member 11 support the ground working members or plows 24, which may be employed to break the crust at opposite sides of the plant row, or for the purpose of cultivation.

While I have hereinbefore particularly defined the ground working members or blades 18 for use in the chopping of cotton or the like, it is also to be understood that the same can be employed with equal facility to break the crust over the seed should the same fail to sprout after excessive rains or otherwise.

Suitably engaged with the frame F are the handle members H, which, in addition to assuring the machine traveling in the desired path, with respect to a plant row, also permits a convenient elevation of the rear portion of the frame to free the members or blades 18 from working the ground when the conditions so require, and particularly where the plants are thin.

From the foregoing description, it is thought to be obvious that an agricultural machine constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising a portable frame, a shaft rotatably supported thereby, oppositely directed forks carried by the shaft, the extremities of the arm of the forks being slotted, a flat blade partly overlapping the extremities of the arms of each of the forks, and a clamping means carried by the blade and extending through the slots of the arms whereby the blade may be adjusted with respect to the shaft, the central portion of a working edge of each of the blades being recessed.

2. A machine of the class described comprising a portable frame, a shaft rotatably supported thereby, oppositely directed forks carried by the shaft, the extremities of the arms of the forks being slotted, a flat blade partly overlapping the extremities of the arms of each of the forks, and a clamping means carried by the blade and extending through the slots of the arms whereby the blade may be adjusted with respect to the shaft, the central portion of an edge of the blade being recessed, the portions of said edge at opposite sides of the recess being toothed.

3. A machine of the class described comprising a portable frame, a shaft rotatably supported thereby, oppositely directed forks carried by the shaft, the extremities of the arms of the forks being slotted, a flat blade partly overlapping the extremities of the arms of each of the forks, and a clamping means carried by the blade and extending through the slots of the arms whereby the blade may be adjusted with respect to the shaft, the opposed edges of each of the blades being of different lengths, the shorter edge being substantially centrally arranged with respect to the longer edge, the central portion of the longer edge of the blade being recessed.

4. A machine of the class described comprising a portable frame, a shaft rotatably supported thereby, oppositely directed forks carried by the shaft, the extremities of the arms of the forks being slotted, a flat blade partly overlapping the extremities of the arms of each of the forks, and a clamping means carried by the blade and extending through the slots of the arms whereby the blade may be adjusted with respect to the shaft, the opposed edges of each of the blades being of different lengths, the shorter edge being substantially centrally arranged with respect to the longer edge, both of said edges of the blade being toothed.

In testimony whereof I hereunto affix my signature.

LOUIS A. HELMS.